(12) United States Patent
Okada et al.

(10) Patent No.: US 10,988,108 B2
(45) Date of Patent: Apr. 27, 2021

(54) TERMINAL, VEHICLE CONTROL SYSTEM, AND VEHICLE CONTROL METHOD FOR SWITCHING AN OPERATION MODE OF THE TERMINAL BASED ON DETECTED VIBRATION

(71) Applicant: TOYOTA JIDOSHA KABUSHIKI KAISHA, Toyota (JP)

(72) Inventors: Hiroki Okada, Toyota (JP); Tomoyuki Funayama, Toyota (JP); Toru Yoshihara, Miyoshi (JP); Shigeki Nishiyama, Nagoya (JP); Masashi Komeya, Toyota (JP); Yuuto Kameyama, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 16/054,433

(22) Filed: Aug. 3, 2018

(65) Prior Publication Data

US 2019/0092278 A1     Mar. 28, 2019

(30) Foreign Application Priority Data

Sep. 27, 2017   (JP) .............................. JP2017-186792

(51) Int. Cl.
*G06F 1/26* (2006.01)
*B60R 25/04* (2013.01)
(Continued)

(52) U.S. Cl.
CPC ............ *B60R 25/04* (2013.01); *B60R 25/406* (2013.01); *G07C 9/00309* (2013.01);
(Continued)

(58) Field of Classification Search
CPC .............................. B06R 25/40; B60R 25/406
See application file for complete search history.

(56) References Cited

U.S. PATENT DOCUMENTS 6,337,626 B1 *  1/2002  Huang .............. G08B 13/1427
                                                    340/10.1
6,476,517 B1 * 11/2002  Okada .................. B60R 25/245
                                                    307/10.1
(Continued)

FOREIGN PATENT DOCUMENTS

DE          19937915 A1    3/2000
FR          2 834 344 A1   7/2003
(Continued)

*Primary Examiner* — Danny Chan
(74) *Attorney, Agent, or Firm* — Oliff PLC (57) ABSTRACT

A terminal performs communication with an in-vehicle device to control a vehicle. The terminal includes a controller configured to switch and set a plurality of operation modes, and a vibration detection unit configured to detect vibration of the terminal. The operation modes include a first mode, a second mode different from the first mode, and a third mode where communication with the in-vehicle device is more restricted than in the first mode and the second mode. The controller is configured to, when the first mode is executed, in a case where vibration is not detected in the vibration detection unit for a predetermined time, switch the operation mode to the third mode, and when the second mode is executed, in a case where vibration is not detected in the vibration detection unit for a time longer than the predetermined time, switch the operation mode to the third mode.

14 Claims, 2 Drawing Sheets

(51) Int. Cl.
*G07C 9/00* (2020.01)
*B60R 25/40* (2013.01)
*H04W 52/02* (2009.01)

(52) U.S. Cl.
CPC ... *H04W 52/0245* (2013.01); *H04W 52/0254* (2013.01); *G07C 2009/0038* (2013.01)

(56) References Cited

U.S. PATENT DOCUMENTS

| | | | | |
|---|---|---|---|---|
| 8,659,414 B1* | 2/2014 | Schuk | ................ | G08B 21/0202 307/10.1 |
| 9,086,879 B2* | 7/2015 | Gautama | ............... | G06F 1/3209 |
| 2006/0255908 A1* | 11/2006 | Gilbert | ................... | B60R 25/24 340/5.61 |
| 2009/0224876 A1* | 9/2009 | McCall | .............. | B60R 25/2009 340/5.61 |
| 2009/0243795 A1* | 10/2009 | Ghabra | ................. | B60R 25/246 340/5.72 |
| 2009/0261945 A1* | 10/2009 | Ko | ........................ | B60R 25/245 340/5.61 |
| 2010/0220857 A1* | 9/2010 | Kawamura | ....... | H04W 12/0401 380/44 |
| 2011/0057817 A1* | 3/2011 | Proefke | .................. | G01S 13/74 340/989 |
| 2014/0114503 A1* | 4/2014 | Ghabra | .................... | H04Q 9/00 701/2 |
| 2014/0232322 A1* | 8/2014 | Kracker | ................. | H02J 7/342 320/103 |
| 2014/0335816 A1* | 11/2014 | Long | ...................... | H04M 1/72541 455/406 |
| 2017/0160786 A1* | 6/2017 | Ji | ............................. | G07C 9/20 |
| 2017/0197586 A1* | 7/2017 | Kawamura | ............. | B60R 25/24 |
| 2017/0328930 A1* | 11/2017 | Unsal | ...................... | G01P 13/00 |
| 2018/0181128 A1* | 6/2018 | Urano | ................ | G01C 21/3617 |
| 2018/0208155 A1* | 7/2018 | Beyer | .................. | B60R 25/045 |
| 2019/0098472 A1* | 3/2019 | Yoshihara | ......... | H04M 1/72577 |

FOREIGN PATENT DOCUMENTS

| | | |
|---|---|---|
| JP | 2009-081746 A | 4/2009 |
| JP | 2010-128610 A | 6/2010 |
| JP | 2012-227586 A | 11/2012 |
| JP | 2014-091434 A | 5/2014 |
| JP | 2014-155057 A | 8/2014 |
| JP | 2016-056659 A | 4/2016 |

* cited by examiner

TERMINAL, VEHICLE CONTROL SYSTEM, AND VEHICLE CONTROL METHOD FOR SWITCHING AN OPERATION MODE OF THE TERMINAL BASED ON DETECTED VIBRATION

INCORPORATION BY REFERENCE

The disclosure of Japanese Patent Application No. 2017-186792 filed on Sep. 27, 2017 including the specification, drawings and abstract is incorporated herein by reference in its entirety.

BACKGROUND

1. Technical Field

The present disclosure relates to a terminal (hereinafter, referred to as a "terminal") that performs communication with an in-vehicle device to control a vehicle, a vehicle control system including the terminal and the in-vehicle device, and a vehicle control method that the system executes.

2. Description of Related Art

For example, Japanese Unexamined Patent Application Publication No. 2012-227586 (JP 2012-227586 A) discloses a system that switches an operation mode (for example, an electric power reduction mode and a normal mode) of an electronic key based on whether or not the electronic key vibrates, thereby achieving electric power saving of the electronic key.

SUMMARY

In the system described in JP 2012-227586 A, in a case where vibration of a terminal, such as an electronic key, is not detected, an operation mode of the terminal is switched instantly (transition is made from the normal mode to the electric power reduction mode). For this reason, in a case where the presence or absence of vibration of the terminal, such as an electronic key, is repeatedly detected in a period shorter than a predetermined time, the operation mode of the terminal is frequently switched, and electric power is consumed for switching processing of the operation mode of the terminal, whereby electric power saving of the terminal, such as an electronic key, may not be achieved.

The disclosure provides a terminal, a vehicle control system, and a vehicle control method capable of further suppressing frequent switching of an operation mode of a terminal and achieving electric power saving.

A first aspect of the disclosure relates to a terminal that performs communication with an in-vehicle device to control a vehicle. The terminal includes a controller and a vibration detection unit. The controller is configured to switch and set a plurality of operation modes of the terminal. The vibration detection unit is configured to detect vibration of the terminal. The operation modes of the terminal include a first mode, a second mode different from the first mode, and a third mode where communication with the in-vehicle device is more restricted than in the first mode and the second mode. The controller is configured to, when the first mode is executed, in a case where vibration is not detected in the vibration detection unit for a predetermined time, switch the operation mode of the terminal to the third mode, and when the second mode is executed, in a case where vibration is not detected in the vibration detection unit for a time longer than the predetermined time, switch the operation mode of the terminal to the third mode.

With the terminal according to the first aspect of the disclosure, control is performed such that, in a case where vibration of the terminal is not detected for the predetermined time using the vibration detection unit that detects vibration of the terminal, the operation mode of the terminal is switched from the first mode to the third mode, and in a case where vibration of the terminal is not detected in the vibration detection unit for the time longer than the predetermined time, the operation mode of the terminal is switched from the second mode to the third mode.

With the above-described control, even though vibration of the terminal is not detected, the operation mode of the terminal is not switched from the first mode or the second mode to the third mode instantly. Accordingly, it is possible to further suppress frequent switching of the operation mode of the terminal due to carelessness in a case where the presence or absence of vibration of the terminal is repeatedly detected in a period shorter than the predetermined time.

The time until the operation mode of the terminal is switched to the third mode in a case where vibration of the terminal is not detected is set to be relatively short in the first mode, and to be relatively long in the second mode. With the above, for example, it is possible to achieve separation and division of control, such as quickly performing mode switching in the first mode to achieve electric power saving of the terminal and to further reduce erroneous transmission due to exogenous noise and preventing unneeded switching of the operation mode of the terminal in the third mode.

In the terminal according to the first aspect of the disclosure, the controller may be configured to set the operation mode of the terminal to the first mode based on getting-off determination in the in-vehicle device.

In the terminal according to the first aspect of the disclosure, the controller may be configured to set the operation mode of the terminal to the second mode based on getting-in determination in the in-vehicle device.

With the above-described determination, it is possible to easily set the first mode and the second mode.

In the terminal according to the first aspect of the disclosure, the getting-in determination may be performed in a case where all doors of the vehicle are closed.

In the terminal according to the first aspect of the disclosure, the getting-off determination may be performed in a case where at least one door of the vehicle is opened.

With the above determination, it is possible to easily perform getting-in determination and getting-off determination to an occupant.

In the terminal according to the first aspect of the disclosure, the controller may be configured to, when the third mode is executed, in a case where a first input operation on the terminal is detected or in a case where vibration is detected in the vibration detection unit, switch the operation mode of the terminal to the first mode.

With the above-described control, even though the operation mode of the terminal is the third mode, it is possible to allow the operation mode of the terminal to be returned to the first mode instantly in a case where vibration of the terminal is detected.

In the terminal according to the first aspect of the disclosure, the controller may be configured to, in a case where predetermined communication using a signal that is generated based on a random number generated by the terminal is successful between the terminal and the in-vehicle device, perform switching of the operation mode of the terminal.

In the terminal according to the first aspect of the disclosure, the controller may be configured to, in a case where predetermined communication using a signal that is generated based on reception strength of a signal transmitted from the in-vehicle device is successful between the terminal and the in-vehicle device, perform switching of the operation mode of the terminal.

In the terminal according to the first aspect of the disclosure, the controller may be configured to, in a case where predetermined communication using a signal that is generated based on the number of communications between the terminal and the in-vehicle device is successful between the terminal and the in-vehicle device, perform switching of the operation mode of the terminal.

With the above-described control, since the terminal switches the operation mode of the terminal solely in a case where the predetermined communication between the terminal and the in-vehicle device is successful, it is possible to further improve security relating to mode switching.

In the terminal according to the first aspect of the disclosure, the vibration detection unit may be configured to detect vibration using an acceleration sensor.

In the terminal according to the first aspect of the disclosure, the controller may be configured to, when the first mode or the second mode is executed, in a case where a second input operation on the terminal is detected, switch the operation mode of the terminal to a fourth mode (hereinafter, referred to as a "fourth mode") where communication with the in-vehicle device is restricted, and when the fourth mode is executed, in a case where a third input operation on the terminal is detected, switch the operation mode of the terminal to the first mode or the second mode.

A second aspect of the disclosure relates to a vehicle control method that a terminal configured to perform communication with an in-vehicle device to control a vehicle executes. The terminal has operation modes of a first mode, a second mode different from the first mode, and a third mode where communication with the in-vehicle device is more restricted than in the first mode and the second mode. The vehicle control method includes detecting vibration of the terminal, when the first mode is executed, in a case where vibration is not detected in the detecting of the vibration for a predetermined time, switching the operation mode of the terminal to the third mode, and when the second mode is executed, in a case where vibration is not detected in the detecting of the vibration for a time longer than the predetermined time, switching the operation mode of the terminal to the third mode.

A third aspect of the disclosure relates to a vehicle control system including an in-vehicle device and a terminal. The terminal performs communication with the in-vehicle device to control a vehicle. The terminal includes a controller, a vibration detection unit, and a transmission unit. The controller is configured to switch and set a first mode that is set based on a first signal transmitted from the in-vehicle device, a second mode that is set based on a second signal transmitted from the in-vehicle device, and a third mode where communication with the in-vehicle device is more restricted than in the first mode and the second mode. The vibration detection unit is configured to detect vibration of the terminal. The transmission unit is configured to receive getting-in determination and getting-off determination from the in-vehicle device. The controller is configured to, when the first mode is executed, in a case where vibration is not detected in the vibration detection unit for a predetermined time, switch an operation mode of the terminal to the third mode, and when the second mode is executed, in a case where vibration is not detected in the vibration detection unit for a time longer than the predetermined time, switch the operation mode of the terminal to the third mode.

According to the second aspect and the third aspect of the disclosure, even though vibration of the terminal is not detected, the operation mode of the terminal is not switched instantly. Accordingly, it is possible to further suppress frequent switching of the operation mode of the terminal due to carelessness.

With the terminal, the vehicle control system, and the vehicle control method according to the aspects of the disclosure, it is possible to further suppress frequent switching of the operation mode of the terminal due to carelessness, and to achieve electric power saving.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

A vehicle control system of the disclosure performs control such that, in a case where vibration of a terminal is not detected for a predetermined time using a vibration detection unit that detects vibration of the terminal, an operation mode of the terminal is switched. With the above, in a case where the presence or absence of vibration of the terminal is repeatedly detected in a period shorter than the predetermined time, it is possible to further suppress frequent switching of the operation mode of the terminal due to carelessness, and to achieve electric power saving.

Configuration of System

Figure 1:
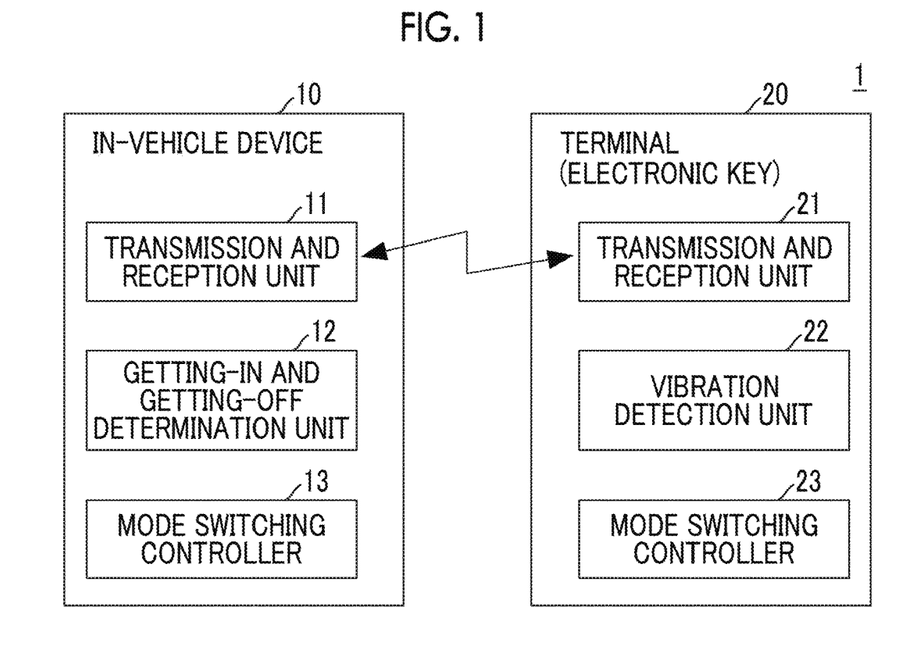
FIG. 1 is a diagram illustrating the schematic configuration of a vehicle control system according to an embodiment.

FIG. 1 is a diagram illustrating the schematic configuration of a vehicle control system 1 according to an embodiment of the disclosure. In FIG. 1, the vehicle control system 1 includes an in-vehicle device 10 that is provided in a vehicle, and a terminal 20 that can be carried with a user or the like.

The vehicle control system 1 performs encryption collation processing through a predetermined communication sequence between the in-vehicle device 10 and the terminal 20 to allow the in-vehicle device 10 to authenticate the terminal 20 and to realize predetermined vehicle control (unlocking or locking of a vehicle door, start of an engine, or the like), or switching of a predetermined operation mode in the terminal 20.

The terminal 20 is a concept including an electronic key dedicated to a vehicle operation, and an electronic apparatus, such as a smartphone, in which predetermined key information downloaded from a server or the like is set. In the following embodiment, the vehicle control system 1 will be described in connection with an example where an electronic key is used as the terminal 20.

In-Vehicle Device

In FIG. 1, the in-vehicle device 10 includes a transmission and reception unit 11, a getting-in and getting-off determination unit 12, and a mode switching controller 13.

The transmission and reception unit 11 can perform communication with a transmission and reception unit 21 of an electronic key 20 described below. Specifically, the transmission and reception unit 11 can transmit an instruction command (hereinafter, referred to a "mode switching command") for switching an operation mode of the electronic key 20 generated in the mode switching controller 13 to the electronic key 20 through a transmission antenna (not shown). The transmission and reception unit 11 can receive a prescribed switch operation (SW operation) input to the electronic key 20 from the electronic key 20 through a reception antenna (not shown).

The getting-in and getting-off determination unit 12 can perform getting-in determination indicating that an occupant gets in the vehicle and getting-off determination indicating that an occupant gets off the vehicle. The getting-in determination may be performed, for example, by detecting change from a state in which any door of the vehicle is opened to a state in which all doors of the vehicle are closed. The getting-in determination may be performed, for example, by detecting change of a seating sensor, a camera sensor, or the like provided inside a vehicle cabin. The getting-in determination may be performed, for example, by detecting change of a suspension of the vehicle. The getting-off determination may be performed, for example, by detecting change from a state in which all doors of the vehicle are closed to a state in which any door of the vehicle is opened. The getting-off determination may be performed, for example, by detecting change of the seating sensor, a camera sensor, or the suspension.

The mode switching controller 13 generates the mode switching command based on the getting-in determination or the getting-off determination performed in the getting-in and getting-off determination unit 12. The mode switching controller 13 performs control such that the transmission and reception unit 11 transmits the generated mode switching command.

The whole or a part of the in-vehicle device 10 described above can be constituted as an electronic control unit (ECU) typically including a central processing unit (CPU), a memory, an input/output interface, and the like. In the electronic control unit, the CPU reads and executes a predetermined program stored in the memory, whereby a predetermined function is realized.

Electronic Key

In FIG. 1, the electronic key 20 includes a transmission and reception unit 21, a vibration detection unit 22, and a mode switching controller 23.

The transmission and reception unit 21 can perform communication with the transmission and reception unit 11 of the in-vehicle device 10. Specifically, the transmission and reception unit 21 can receive the mode switching command for switching the operation mode of the electronic key 20 from the in-vehicle device 10 through a reception antenna (not shown). The transmission and reception unit 21 can transmit information of a prescribed switch operation (SW operation) input to the electronic key 20 to the in-vehicle device 10 through a transmission antenna (not shown).

The vibration detection unit 22 can detect whether or not the electronic key 20 vibrates. For the vibration detection, for example, an acceleration sensor can be used. A result of the vibration detection is output to the mode switching controller 23.

The mode switching controller 23 can switch and set the operation mode of the electronic key 20 according to the result of the vibration detection output from the vibration detection unit 22 or the mode switching command received by the transmission and reception unit 21. The electronic key 20 according to the embodiment has a plurality of modes as a switchable operation mode. The modes will be described below.

State Transition of System

Figure 2:
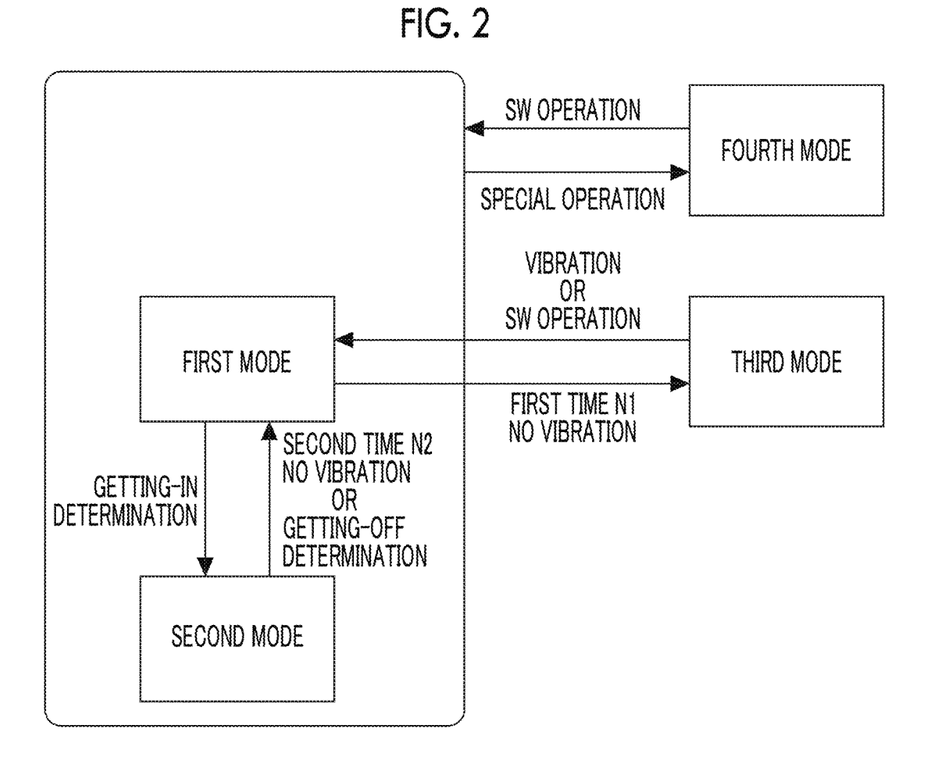
FIG. 2 is a state transition diagram of a terminal in the vehicle control system according to the embodiment.

FIG. 2 is a state transition diagram of the electronic key 20 in the vehicle control system 1 according to the embodiment of the disclosure. As shown in FIG. 2, in the vehicle control system 1, the electronic key 20 has a first mode, a second mode, a third mode, and a fourth mode as a switchable operation mode.

Basic Transition

1. First Mode

The first mode is a mode that is set based on getting-off determination in the in-vehicle device 10, and is, for example, an extra-vehicle cabin mode. The first mode can be set based on a first signal that is transmitted from the in-vehicle device 10 in a case where the getting-off determination is performed in the in-vehicle device 10. In the first mode, communication between the electronic key 20 and the in-vehicle device 10 is not restricted.

In the first mode, in a case where vibration of the electronic key 20 is not detected by the vibration detection unit 22 for a predetermined time (hereinafter, referred to as a "first time N1"), the operation mode of the electronic key 20 is switched from the first mode to the third mode, and state transition is made. In the first mode, in a case where the getting-in determination is performed in the in-vehicle device 10, the operation mode of the electronic key 20 is switched from the first mode to the second mode, and state transition is made.

2. Second Mode

The second mode is a mode that is set based on getting-in determination in the in-vehicle device 10, and is, for example, an intra-vehicle cabin mode. The second mode can be set based on a second signal that is transmitted from the in-vehicle device 10 in a case where the getting-in determination is performed in the in-vehicle device 10. As in the first mode, in the second mode, communication between the electronic key 20 and the in-vehicle device 10 is not restricted.

In the second mode, in a case where vibration of the electronic key 20 is not detected by the vibration detection unit 22 for a predetermined time (hereinafter, referred to as a "second time N2") or in a case where the getting-off determination is performed in the in-vehicle device 10, the operation mode of the electronic key 20 is switched from the second mode to the first mode, and state transition is made. In the former case, in the second mode, in a case where vibration of the electronic key 20 is not detected by the vibration detection unit 22 for the first time N1 besides the second time N2, the operation mode of the electronic key 20 is switched from the second mode to the third mode. Accordingly, in the second mode, in a case where vibration of the electronic key 20 is not detected by the vibration detection unit 22 for a time (=the first time N1+the second time N2) longer than the first time N1, the operation mode of the electronic key 20 is switched from the second mode to the third mode.

3. Third Mode

The third mode is a mode that is set based on the result of the vibration detection in the vibration detection unit 22. In the third mode, communication between the electronic key 20 and the in-vehicle device 10 is restricted. A content of restriction in the third mode may be disabling reception of an electric wave signal from the in-vehicle device 10, disabling a response to an electric wave signal received from the in-vehicle device 10, or a combination thereof. With the restriction of the third mode, since it is possible to reduce electric power of the electronic key 20 that is consumed for communication with the in-vehicle device 10, the third mode may also be referred to as an electric power reduction mode or an electric power saving mode.

In the third mode, in a case where vibration is detected by the vibration detection unit 22 or in a case where a prescribed switch operation (SW operation) is performed, the operation mode of the electronic key 20 is switched from the third mode to the first mode, and state transition is made. The prescribed switch operation is, for example, depression of a door unlock button provided in the electronic key 20, or the like.

4. Fourth Mode

The fourth mode is a mode where communication between the electronic key 20 and the in-vehicle device 10 is restricted. A content of restriction in the fourth mode may be the same as in the third mode, or further restriction may be put compared to the third mode (for example, stopping of the operation of the vibration detection unit 22, or the like).

Switching to the fourth mode is performed in a case where a prescribed special operation is performed in the first mode or the second mode. The prescribed special operation is, for example, an operation of a dedicated button provided in the electronic key 20, or the like.

In the fourth mode, in a case where a prescribed switch operation (SW operation) is performed, the operation mode of the electronic key 20 is switched from the fourth mode to the first mode or the second mode, and state transition is made. The mode to be switched may be prescribed or may be determined according to an electric wave signal transmitted from the vehicle. The prescribed switch operation is, for example, depression of a door unlock button provided in the electronic key 20, or the like.

In the operation mode of the electronic key 20 described above, for example, in a scene where the first mode assuming that the electronic key 20 is outside the vehicle cabin is set, the first time N1 is set to be relatively short, and it is possible to quickly switch the operation mode of the electronic key 20 from the first mode to the third mode. Accordingly, electric power saving of the electronic key 20 is achieved. Since communication with the in-vehicle device 10 is restricted in the third mode, it is possible to reduce erroneous transmission of the electronic key 20 due to exogenous noise, and to expect an effect of further improving security of the vehicle.

For example, in a scene where the second mode assuming that the electronic key 20 is inside the vehicle cabin is set, the second time N2 is set to be relatively long, for example, longer than the first time N1, and it is possible to further delay the time until the operation mode of the electronic key 20 is switched from the second mode to the third mode. For this reason, it is possible to further suppress switching of the operation mode of the electronic key 20 to the third mode due to carelessness at the time of vehicle traveling.

Determination about whether the electronic key 20 is outside the vehicle cabin or inside the vehicle cabin can be performed with an electric wave signal that is transmitted from the in-vehicle device 10 outward of the vehicle cabin or inward of the vehicle cabin, other than determining the opening and closing of the vehicle doors.

Modification Transition

Figure 3:
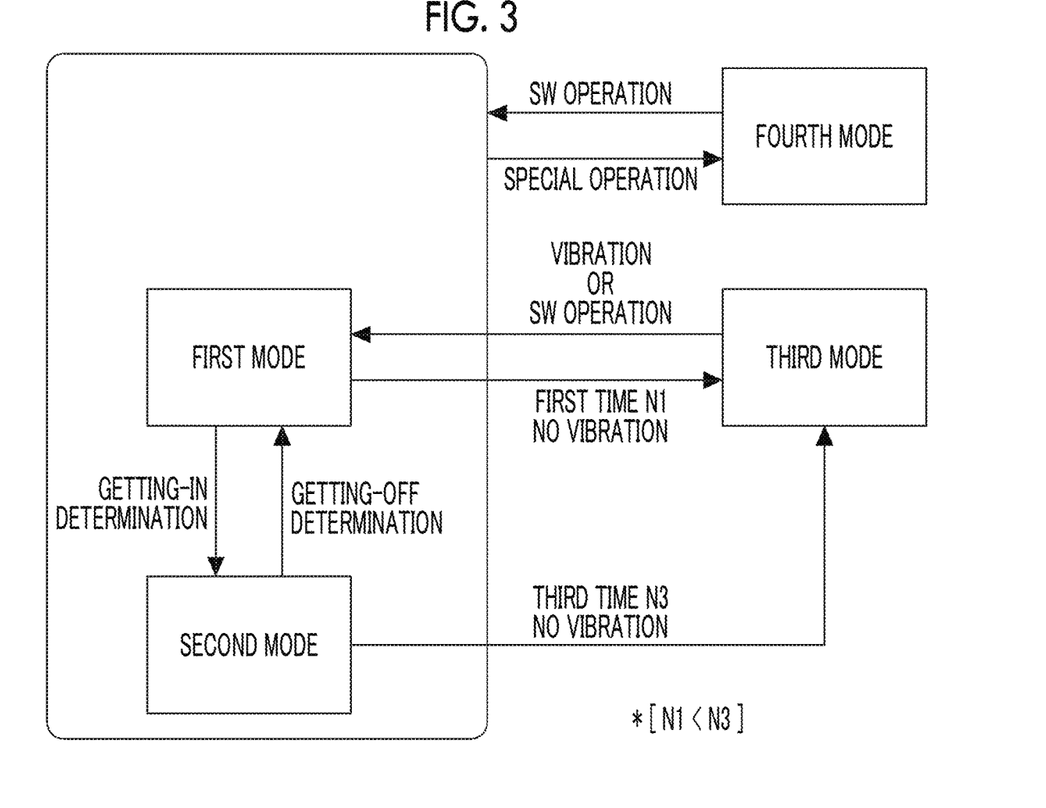
FIG. 3 is another state transition diagram of the terminal in the vehicle control system according to the embodiment.

FIG. 3 is a state transition diagram of the electronic key 20 according to a modification example in the vehicle control system 1 according to the embodiment. In comparison of the state transition diagram shown in FIG. 3 with the state transition diagram shown in FIG. 2, while the switchable operation modes of the electronic key 20 are the same, a condition for switching from the second mode to the first mode and the third mode is different as follows.

In the second mode, in a case where vibration of the electronic key 20 is not detected by the vibration detection unit 22 for a predetermined time (hereinafter, referred to as a "third time N3"), the operation mode of the electronic key 20 is switched directly from the second mode to the third mode, and state transition is made. In the second mode, in a case where the getting-off determination is performed in the in-vehicle device 10, the operation mode of the electronic key 20 is switched from the second mode to the first mode, and state transition is made. The third time N3 may be a time longer than the first time N1, or may be a time (=N1+N2) obtained by adding the first time N1 and the second time N2.

According to the modification example, it is possible to achieve electric power saving of the electronic key 20, to further reduce erroneous transmission of the electronic key 20 due to exogenous noise, and to further improve security of the vehicle. Furthermore, it is possible to further suppress switching of the operation mode of the electronic key 20 to the first mode due to carelessness at the time of vehicle traveling.

Specific Example of Mode Switching

In the embodiment, an example where the electronic key 20 can switch the operation mode according to the mode switching command transmitted from the in-vehicle device 10 has been described. Here, a switching method example of the operation mode of the electronic key 20 with further improved security will be described.

In a specific example of mode switching, in a case where predetermined communication using a signal that is generated based on a predetermined value X updated each time the first signal is received is successful between the electronic key 20 and the in-vehicle device 10, the electronic key 20 performs switching processing of the operation mode according to the mode switching command. The predetermined communication can be performed, for example, as follows referring to FIG. 4.

Figure 4:
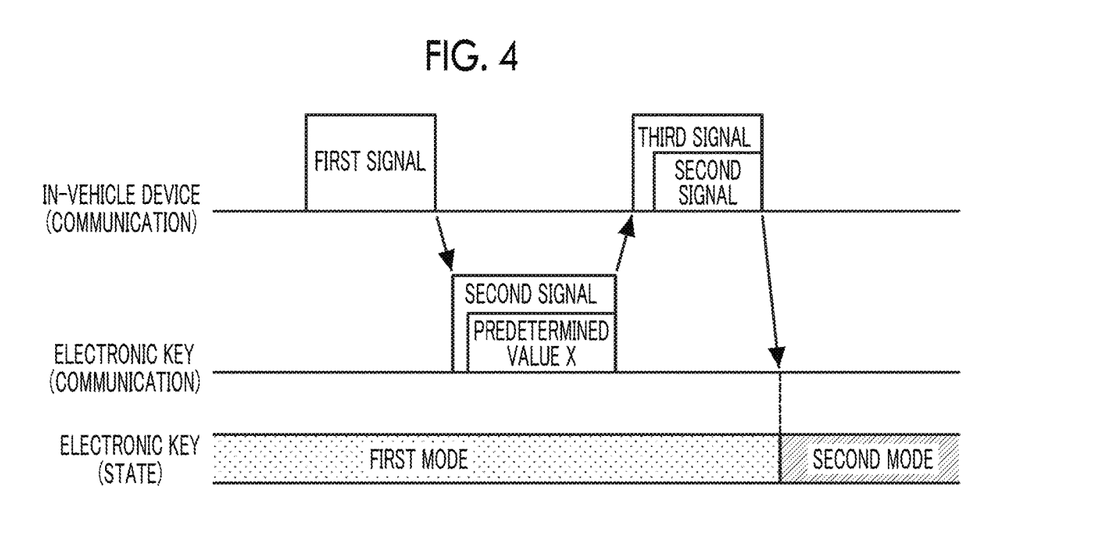
FIG. 4 shows an example of a communication sequence that is executed between an in-vehicle device and the terminal.

In a case where there is a need to switch the operation mode of the electronic key 20 with determination in the getting-in and getting-off determination unit 12, the in-vehicle device 10 transmits the first signal including a mode switching request to the electronic key 20. In a case where the first signal is received from the in-vehicle device 10, the electronic key 20 generates the second signal based on the predetermined value X and transmits the second signal to the in-vehicle device 10. In a case where the second signal is received from the electronic key 20, the in-vehicle device 10 generates the mode switching command (third signal) based on the second signal and transmits the mode switching command (third signal) to the in-vehicle device 10. In a case where the mode switching command (third signal) is received from the in-vehicle device 10, the electronic key 20 determines whether or not the command is generated based on the predetermined value X. In a case where determination is made that the mode switching command is generated based on the predetermined value X, the electronic key 20 switches the operation mode of the electronic key 20.

For the predetermined value X, for example, a random number, reception strength (received signal strength indicator (RSSI)) of the first signal in the electronic key 20, a communication frequency between the electronic key 20 and the in-vehicle device 10, and the like can be used. For example, in a case where the electronic key 20 is provided with random number generation means, a random number that is generated each time the electronic key 20 receives the first signal can be acquired as the predetermined value X. For example, a Burst signal for RSSI measurement is included in the first signal in advance, and reception strength of the Burst signal that is measured each time the electronic key 20 receives the first signal can be acquired as the predetermined value X. For example, the electronic key 20 is provided with a counter, and a counter value that is integrated each time the electronic key 20 receives the first signal can be acquired as the predetermined value X.

Functional Effects of Embodiment

As described above, with the vehicle control system 1 according to the embodiment of the disclosure, in a case where vibration of the electronic key 20 is not detected for the first time N1 using the vibration detection unit 22 that detects vibration of the electronic key 20, control is performed such that the operation mode of the electronic key 20 is switched from the second mode to the first mode, and in a case where vibration of the electronic key 20 is not detected in the vibration detection unit 22 for "the first time N1+the second time N2" or "the third time N3" longer than the first time N1, control is performed such that the operation mode of the electronic key 20 is switched from the third mode to the first mode.

With the above-described control, even though vibration of the electronic key 20 is not detected, the operation mode of the electronic key 20 is not switched from the second mode or the third mode to the first mode instantly. Accordingly, it is possible to further suppress frequent switching of the operation mode of the electronic key 20 due to carelessness in a case where the presence or absence of vibration of the electronic key 20 is repeatedly detected in a period shorter than the first time N1.

The time until the operation mode of the electronic key 20 is switched to the first mode in a case where vibration of the electronic key 20 is not detected is set to the relatively short first time N1 in the second mode, and to be the relatively long "first time N1+second time N2" or "third time N3" in the third mode. With the above, for example, in the second mode that is the extra-vehicle cabin mode, it is possible to achieve separation and division of control, such as quickly performing mode switching to achieve electric power saving of the electronic key 20 and to further reduce erroneous transmission due to exogenous noise, and in the third mode that is the intra-vehicle cabin mode, preventing unneeded switching of the operation mode of the electronic key 20.

The disclosure is usable in a vehicle control system that an in-vehicle device and an electronic key perform communication to control a vehicle, or the like. In addition, the disclosure is not limited to the above-described embodiment, and various alterations may be made without departing from the spirit and scope of the disclosure described in the claims.

What is claimed is:

1. A terminal configured to perform communication with an in-vehicle device to control a vehicle, the terminal comprising:
   a controller configured to switch and set a plurality of operation modes of the terminal; and
   a vibration detection unit configured to detect vibration of the terminal, wherein:
   the operation modes of the terminal include:
      a first mode,
      a second mode different from the first mode, and
      a third mode where communication with the in-vehicle device is more restricted than in the first mode and the second mode; and
   the controller is configured to:
      when the first mode is executed, in a case where vibration is not detected in the vibration detection unit for a first time, switch the operation mode of the terminal to the third mode,
      when the second mode is executed, in a case where vibration is not detected in the vibration detection unit for a second time which is longer than the first time, switch the operation mode of the terminal to the third mode,
      switch the operation mode of the terminal from the first mode to the second mode based on a getting-in determination in the in-vehicle device, indicating that an occupant gets in a vehicle,
      switch the operation mode of the terminal from the second mode to the first mode based on a getting-off determination in the in-vehicle device, indicating that an occupant gets off the vehicle, and
      perform switching of the operation mode of the terminal between the first mode and the second mode only in a case where predetermined communication using a signal that is generated based on a random number generated by the terminal is successful between the terminal and the in-vehicle device.

2. The terminal according to claim 1, wherein the in-vehicle device includes a getting-in and getting-off determination unit that is configured to perform getting-in determination by detecting a change from a state in which any of the doors of the vehicle is opened to a state in which all doors of the vehicle are closed.

3. The terminal according to claim 2, wherein the getting-in and getting-off determination unit is configured to perform getting-in determination and getting-off determination by detecting a change of a sensor provided inside a vehicle cabin or by detecting a change of a suspension of the vehicle.

4. The terminal according to claim 1, wherein the in-vehicle device includes a getting-in and getting-off determination unit that is configured to perform getting-off determination by detecting a change from a state in which all doors of the vehicle are closed to a state in which at least one door of the vehicle is opened.

5. The terminal according to claim 4, wherein the getting-in and getting-off determination unit is configured to perform getting-in determination and getting-off determination by detecting a change of a sensor provided inside a vehicle cabin or by detecting a change of a suspension of the vehicle.

6. The terminal according to claim 1, wherein the controller is configured to, when the third mode is executed, in a case where a first input operation on the terminal is detected or in a case where vibration is detected in the vibration detection unit, switch the operation mode of the terminal to the first mode.

7. The terminal according to claim 1, wherein the vibration detection unit is configured to detect vibration using an acceleration sensor.

8. The terminal according to claim 1, wherein the controller is configured to
when the first mode or the second mode is executed, in a case where a second input operation on the terminal is detected, switch the operation mode of the terminal to a fourth mode where communication with the in-vehicle device is restricted, and
when the fourth mode is executed, in a case where a third input operation on the terminal is detected, switch the operation mode of the terminal to the first mode or the second mode.

9. A terminal configured to perform communication with an in-vehicle device to control a vehicle, the terminal comprising:
a controller configured to switch and set a plurality of operation modes of the terminal; and
a vibration detection unit configured to detect vibration of the terminal, wherein:
the operation modes of the terminal include:
a first mode,
a second mode different from the first mode, and
a third mode where communication with the in-vehicle device is more restricted than in the first mode and the second mode; and
the controller is configured to:
when the first mode is executed, in a case where vibration is not detected in the vibration detection unit for a first time, switch the operation mode of the terminal to the third mode,
when the second mode is executed, in a case where vibration is not detected in the vibration detection unit for a second time which is longer than the first time, switch the operation mode of the terminal to the third mode,
switch the operation mode of the terminal from the first mode to the second mode based on a getting-in determination in the in-vehicle device, indicating that an occupant gets in a vehicle,
switch the operation mode of the terminal from the second mode to the first mode based on a getting-off determination in the in-vehicle device, indicating that an occupant gets off the vehicle, and
perform switching of the operation mode of the terminal between the first mode and the second mode only in a case where predetermined communication using a signal that is generated based on a number of communications between the terminal and the in-vehicle device is successful between the terminal and the in-vehicle device.

10. The terminal according to claim 9, wherein the in-vehicle device includes a getting-in and getting-off determination unit that is configured to perform getting-in determination by detecting a change from a state in which any of the doors of the vehicle is opened to a state in which all doors of the vehicle are closed.

11. The terminal according to claim 9, wherein the in-vehicle device includes a getting-in and getting-off determination unit that is configured to perform getting-off determination by detecting a change from a state in which all doors of the vehicle are closed to a state in which at least one door of the vehicle is opened.

12. The terminal according to claim 9, wherein the controller is configured to, when the third mode is executed, in a case where a first input operation on the terminal is detected or in a case where vibration is detected in the vibration detection unit, switch the operation mode of the terminal to the first mode.

13. A vehicle control method that a terminal configured to perform communication with an in-vehicle device to control a vehicle executes, the terminal having operation modes of a first mode, a second mode different from the first mode, and a third mode where communication with the in-vehicle device is more restricted than in the first mode and the second mode, the vehicle control method comprising:
detecting vibration of the terminal;
when the first mode is executed, in a case where vibration is not detected in the detecting of the vibration for a first time, switching the operation mode of the terminal to the third mode;
when the second mode is executed, in a case where vibration is not detected in the detecting of the vibration for a second time which is longer than the first time, switching the operation mode of the terminal to the third mode;
switching the operation mode of the terminal from the first mode to the second mode based on a getting-in determination in the in-vehicle device, indicating that an occupant gets in a vehicle;
switching the operation mode of the terminal from the second mode to the first mode based on a getting-off determination in the in-vehicle device, indicating that an occupant gets off the vehicle; and
perform switching of the operation mode of the terminal between the first mode and the second mode only in a case where predetermined communication using a signal that is generated based on a random number generated by the terminal is successful between the terminal and the in-vehicle device.

14. A vehicle control system comprising:
an in-vehicle device; and
a terminal configured to perform communication with the in-vehicle device to control a vehicle, the terminal including
a controller configured to switch and set a first mode that is set based on a first signal transmitted from the in-vehicle device, a second mode that is set based on a second signal transmitted from the in-vehicle device, and a third mode where communication with the in-vehicle device is more restricted than in the first mode and the second mode,
a vibration detection unit configured to detect vibration of the terminal, and
a transmission unit configured to receive getting-in determination and getting-off determination from the in-vehicle device, wherein:
the controller is configured to:
when the first mode is executed, in a case where vibration is not detected in the vibration detection unit for a first time, switch an operation mode of the terminal to the third mode,
when the second mode is executed, in a case where vibration is not detected in the vibration detection unit for a second time which is longer than the first time, switch the operation mode of the terminal to the third mode,
switch the operation mode of the terminal from the first mode to the second mode based on a getting-in determination in the in-vehicle device, indicating that an occupant gets in a vehicle,
switch the operation mode of the terminal from the second mode to the first mode based on a getting-off determination in the in-vehicle device, indicating that an occupant gets off the vehicle, and perform switching of the operation mode of the terminal between the first mode and the second mode only in a case where predetermined communication using a signal that is generated based on a random number generated by the terminal is successful between the terminal and the in-vehicle device.

* * * * *